United States Patent [19]

Gilmour

[11] Patent Number: 5,741,607
[45] Date of Patent: Apr. 21, 1998

[54] RECHARGEABLE ELECTROCHEMICAL CELL

[75] Inventor: Alexander Gilmour, Henley-on-Thames, United Kingdom

[73] Assignee: Lexcel Technology Limited, Oxon, United Kingdom

[21] Appl. No.: 765,154

[22] PCT Filed: Jun. 8, 1995

[86] PCT No.: PCT/GB95/01337

§ 371 Date: Dec. 11, 1996

§ 102(e) Date: Dec. 11, 1996

[87] PCT Pub. No.: WO95/34920

PCT Pub. Date: Dec. 21, 1995

[30] Foreign Application Priority Data

Jun. 16, 1994 [GB] United Kingdom ............... 9412045

[51] Int. Cl.$^6$ ................ H01M 4/58; H01M 10/40
[52] U.S. Cl. ................ 429/94; 429/194; 429/218
[58] Field of Search ................ 429/194, 218, 429/221, 223, 224, 94, 197

[56] References Cited

U.S. PATENT DOCUMENTS

| 5,278,000 | 1/1994 | Huang et al. | 429/218 X |
| 5,352,548 | 10/1994 | Fujimoto et al. | 429/194 X |
| 5,525,443 | 6/1996 | Okumo et al. | 429/194 |
| 5,538,814 | 7/1996 | Kamauchi et al. | 429/218 |
| 5,554,458 | 9/1996 | Noda et al. | 429/194 |

*Primary Examiner*—Anthony Skapars
*Attorney, Agent, or Firm*—Iandiorio & Teska

[57] ABSTRACT

A rechargeable electrochemical cell comprising a positive electrode, a negative electrode and an electrolyte, the positive electrode being such that it is a composition of an alkali or alkaline earth salt of a sulphur oxy-acid and a transition metal oxide, and the electrolyte being such that it is a non-aqueous electrolyte containing a soluble salt of the alkali or alkaline earth metal dissolved in the non-aqueous electrolyte.

12 Claims, 2 Drawing Sheets

RECHARGEABLE ELECTROCHEMICAL CELL

This invention relates to a rechargeable electrochemical cell. The rechargeable electrochemical cell may be used as a storage battery or as a capacitor.

Non-rechargeable lithium electrochemical cells are well known. In one application a two cell battery is used in the consumer field and it has a manganese dioxide positive electrode. In another application a battery used in the military field employs a lithium sulphur dioxide liquid electrolyte de-polarizer system. Both of these battery systems are renowned for their high energy densities of more than 300 Watt hours/Kg, high power densities and modest raw material costs. Attempts to recharge such primary cells have met with little or no success. In the case of the manganese dioxide cell, the product formed on electrochemical reduction with lithium at the positive electrode has a radically altered chemical structure and the lithium intercalated on discharge is recoverable to a small extent only on current reversal. With the lithium sulphur dioxide liquid electrolyte/depolarizer system, the presence of sulphur dioxide in direct contact with lithium metal at the negative electrode gives an immediate reaction product on the surface of the lithium metal. This makes the plating of bulk lithium metal, as required on recharge, grossly inefficient since the regenerated electrode is being consumed as it is formed. Cells containing the highly volatile sulphur dioxide as a major electrolyte constituent have the attendant disadvantages of requiring expensive reinforced cell containers and corrosion resistant hermetic seals to obviate the expulsion of noxious sulphur dioxide fumes into the atmosphere, such as would occur under abuse conditions.

It is an aim of the present invention to provide a rechargeable electrochemical cell which combines the flat voltage characteristic of a sulphur dioxide electrode on discharge, with an immobilizing host in the form of a transition metal oxide.

Accordingly, the present invention provides a rechargeable electrochemical cell comprising a positive electrode, a negative electrode and an electrolyte, the positive electrode being such that it is a composition of an alkali or alkaline earth salt of a sulphur oxy-acid and a transition metal oxide, and the electrolyte being such that it is a non-aqueous electrolyte containing a soluble salt of the alkali or alkaline earth metal dissolved the non-aqueous electrolyte.

Preferably, the salt of a sulphur oxy-acid is a lithium salt. The lithium salt is preferably lithium sulphite ($Li_2SO_3$), lithium dithionate ($Li_2S_2O_6$) or lithium dithionite ($Li_2S_2O_4$).

The transition metal is preferably one or more of ferrous oxide (FeO), titanium monoxide (TiO), manganous oxide (MnO), manganic oxide ($Mn_2O_3$), vanadium trioxide ($V_2O_3$), vanadium dioxide ($VO_2$), cuprous oxide ($Cu_2O$) or nickelous oxide (NiO). Many other transition metal oxides may be used as will be familiar to those versed in this technology. The oxides may be used singly or in combination.

The alkali or alkaline salt in solution is preferably present in approximately 1 molar concentration. Other concentrations may however be employed, with a preferred molar concentration range being 0.5–2 molar concentration.

The alkali or alkaline salt in solution in the electrolyte is preferably a lithium salt. Other alkali or alkaline earth salts may however be employed, with the corresponding sulphur oxy-acid salt in the cathode.

A soluble salt of the alkali or alkaline earth metal must always be present in the non-aqueous electrolyte solution.

For lithium this can be lithium fluoroborate or lithium hexafluorophosphate or a number of other complex lithium fluorides, for example, lithium trifluoromethane sulphonimide $LiN(CF_3SO_2)_2$. The said salt provides a source of alkali-metal ions or alkaline earth metal ions in solution for electroplating alkali metal or alkaline earth metal from the cathode compound or complex, for example lithium sulphite which is totally insoluble in the electrolyte. The alkali or alkaline earth metal in solution must be the same as the alkali or alkaline earth salt of the sulphur oxy-acid in the cathode. The process of operation of say the rechargeable lithium electrochemical cell may be thought of as a shuttle of lithium going from a lithium compound in the cathode to lithium metal at the anode following the charge process.

The cell may include a separator which is permeable to the lithium ions. The rechargeable electrochemical cell may then be one in which the lithium salt is lithium fluoroborate ($LiBF_4$) and/or lithium hexafluorophosphate $LiPF_6$ or $LiN(CF_3SO_2)_2$. Suitable solvents are a mixture of a linear carbonate and a cyclic ester. The linear carbonate is preferably diethyl carbonate or dimethyl carbonate. The cyclic ester is preferably polypropylene carbonate or ethylene carbonate. The separator is preferably a microporous polypropylene. In the case of lithium ions, the separator allows permeation of lithium ions but will not allow lithium metal plated at the anode to get in electrical contact with the cathode.

The negative electrode current collector is preferably copper. Nickel or other metals may also be employed.

The negative electrode current collector may alternatively be coated with a porous substrate into which deposited alkali or alkaline earth metal will intercalate. The porous substrate may be a porous substrate of conductive finely divided carbon.

Both electrodes may include a binding agent. The binding agent has two functions. It holds the constituents of the cathode together so that a thin layer or film can be applied to the substrate electrode collector. It also enables adhesion of this layer to be effective to the substrate. Many organic polymers are suitable, examples being polyvinylidene fluoride and ethylene propylene diene terpolymer.

The rechargeable electrochemical cell may be cylindrical in shape.

The cylindrical rechargeable electrochemical cell may be one in which the composition of the alkali or alkaline earth salt of the sulphur oxy-acid and the transition metal oxide is provided on a substrate which is wound in the form of a roll. The substrate is preferably a foil substrate. A presently preferred foil substrate is an aluminium foil substrate.

The rechargeable electrochemical cell may be in the shape of a disc. The disc may be in the shape of a button or a coin.

The rechargeable electrochemical cell may be rectangular in shape and have multiple layers folded zig zag fashion.

The rechargeable electrochemical cell may be in the form of a battery or a super capacitor.

Preferably, the rechargeable electrochemical cell uses a lithium salt of a sulphur oxy-acid as the uncharged cathode. In order to ensure that the charged or active cathode material takes the form of an insoluble solid, the sulphur oxides formed by electrode decomposition of lithium oxy-acid salts must combine or complex with an appropriate substrate in order to preclude action with the lithium negative electrode. In the rechargeable electrochemical cell of the present invention, the transition metal oxides react with the sulphur oxides formed on charging the lithium sulphur oxy-acid composition, thereby acting in the role of a de-fluidizing agent.

If desired, in accordance with the present invention, the composition may also include one or more polymeric tertiary amines.

The electrolyte is non-aqueous because the presence of water at concentrations as low as 10 parts per million is detrimental since the water would react instantly with the alkali metal or alkaline earth metal formed in a finely divided state on charge. The non-aqueous electrolyte is preferably a non-aqueous organic solvent. It is essential that none of the constituents of the positive electrode composition in either the charged or the discharged state, are soluble in the electrolyte solution.

The electrochemical process taking place in the rechargeable electrochemical cell of the present invention may be represented as follows:

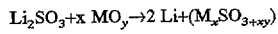

$$Li_2SO_3 + x\, MO_y \rightarrow 2\, Li + (M_xSO_{3+xy})$$

complex in which M is the transition metal atom, and in which $1 \leq x \leq 4$ and $0.5 \leq y \leq 2.5$.

Lithium sulphite ($Li_2SO_3$) is an efficient source of lithium because it has two lithium atoms per sulphur atom present. The utilisation of lithium metal in the discharge process is thus up to twice that obtainable in competitive systems, especially those based on cobalt and manganese oxide.

In order that the invention is fully understood, reference will now be made to the following Examples.

EXAMPLE I

A mixture of lithium sulphite and vanadium dioxide in a 1:2 molar ratio was intimately ground together using a pestle and mortar. The ground mixture was then heated for 3 hours at 200° C. under vacuum in order to remove traces of water absorbed on standing. A 3% solution of polyvinylidene fluoride in N-methylpyrrolidone was prepared and to this was added carbon black which was obtained from MMM Sedema under the trade name Super S+. The carbon black was added in proportion to give 60% by weight carbon black and 40% by weight polyvinylidene fluoride in the resulting dried powder. 20% by weight of the dried powder was added to the mixture of the lithium sulphite and the vanadium dioxide, the composite positive electrode thus containing 80% of the active material. After thorough mixing together of the composite, a 25 mm diameter disc, approximately 1 mm thick, was prepared by pressing with a load of 15 tonnes.

The disc was placed in a test cell in which a microporous polypropylene separator 25 microns thick was used, together with a copper disc as a target negative electrode. A 1 molar solution of lithium fluoborate in an anhydrous mixture of equal volumes of propylene carbonate and diethyl carbonate was used as an electrolyte to saturate the positive electrode and the separator. The rechargeable electrochemical cell was charged at a current density of 0.8 ma/cm² for 6 hours, the applied voltage starting at 3.5 volts and rising to a maximum of 4.25 volts. On discharge at a current density of 1 ma/cm², the average voltage was 3.35 volts and all the energy removed was at around 2.7 volts, the discharge curve being remarkably flat. Repeated charge/discharge cycling resulted in a coulometric efficiency greater than 98% on successive cycles.

EXAMPLE II

A mixture of lithium sulphite and ferrous oxalate ($FeC_2O_4 \cdot 2H_2O$) in a 1:2 molar ratio was intimately ground together using a pestle and mortar. The mixture was then heated at 300° C. for 2 hours under vacuum in order to convert the oxalate to oxide and to remove all the water present. After cooling, the product was mixed with carbon black and polyvinylidene fluoride as described in Example I, the active materials content again being 80% by weight. A rechargeable electrochemical cell was prepared as described in Example I and the cell was placed on charge. The voltage range necessary to charge at 0.8 ma/cm² started at 3.2 volts and rose to a maximum of 3.9 volts. On discharge at a current density of 1 ma/cm² the average running voltage was just above 3 volts and the end point was selected at 2.4 volts. The discharge curve was not as flat as in Example I, the active material appearing to develop a higher internal resistance on cycling. A coulometric efficiency greater than 95% was realised.

EXAMPLE III

A mixture of lithium sulphite and nickelous oxide in a 1:2 molar ratio was intimately ground together using a pestle and mortar. The mixture was heated at 200° C. for 2 hours under vacuum and then reground. The mixture was then prepared and formed into a rechargeable electrochemical cell as described in Example I. For a 0.8 ma/ca² charging current, the applied voltage ranged between 3.4 volts and 4.0 volts. On discharge at a current density of 1 ma/cm², and average voltage of 3.2 volts was observed with an end point of around 2.5 volts. The form of the discharge curve and the coulometric efficiency was similar to that observed in Example II.

EXAMPLE IV

A mixture of lithium sulphite and cuprous oxide in a 1:1 molar ratio was intimately ground together using a pestle and mortar. The mixture was heated at 200° C. for 2 hours under vacuum and then reground. A rechargeable electrochemical cell was produced as described in Example I. For a 0.8 ma/cm² charging current, the applied voltage required was between the limits of 3.2 volts and 3.9 volts. On discharge at a current density of 1 ma/cm², a two step discharge curve was observed with a joining plateau at around 2.85 volts. With this composition, the average discharge voltage was just below 3 volts but the cycling efficiency was greater than 95%.

From the above Examples, it is evident that the voltage characteristics of the composite $Li_2SO_3 xMO_y$ positive electrode on charging are at a higher level in every instance than the individual voltages of either the $MO_y$ material alone or $SO_2$ which is the redox or valency state in $Li_2SO_3$. Assuming the initial product of the electrolytic decomposition of $Li_2SO_3$ which occurs on charging is $SO_3$ (along with Li metal) the strong oxidising nature of $SO_3$ will be targeted to attack the metal oxide $MO_y$. It is postulated that an equilibrium will be established, governed by the free energy factor and the complex shown in above equation may be more properly represented as:

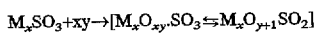

$$M_xSO_3 + xy \rightarrow [M_xO_{xy} \cdot SO_3 \rightleftharpoons M_xO_{y+1} SO_2]$$

This infers that the valency state of sulphur in the charged complex is between 4 and 6. The higher voltage realised in the rechargeable electrochemical cells is believed to be due to the presence of a substantial proportion of sulphur oxide in the 6-valent state which is formed from $Li_2SO_3$ as the result of electrolytic decomposition taking place on charging.

Embodiments of the invention will now be described solely by way of example and with reference to the accompanying drawings in which.

Figure 1:
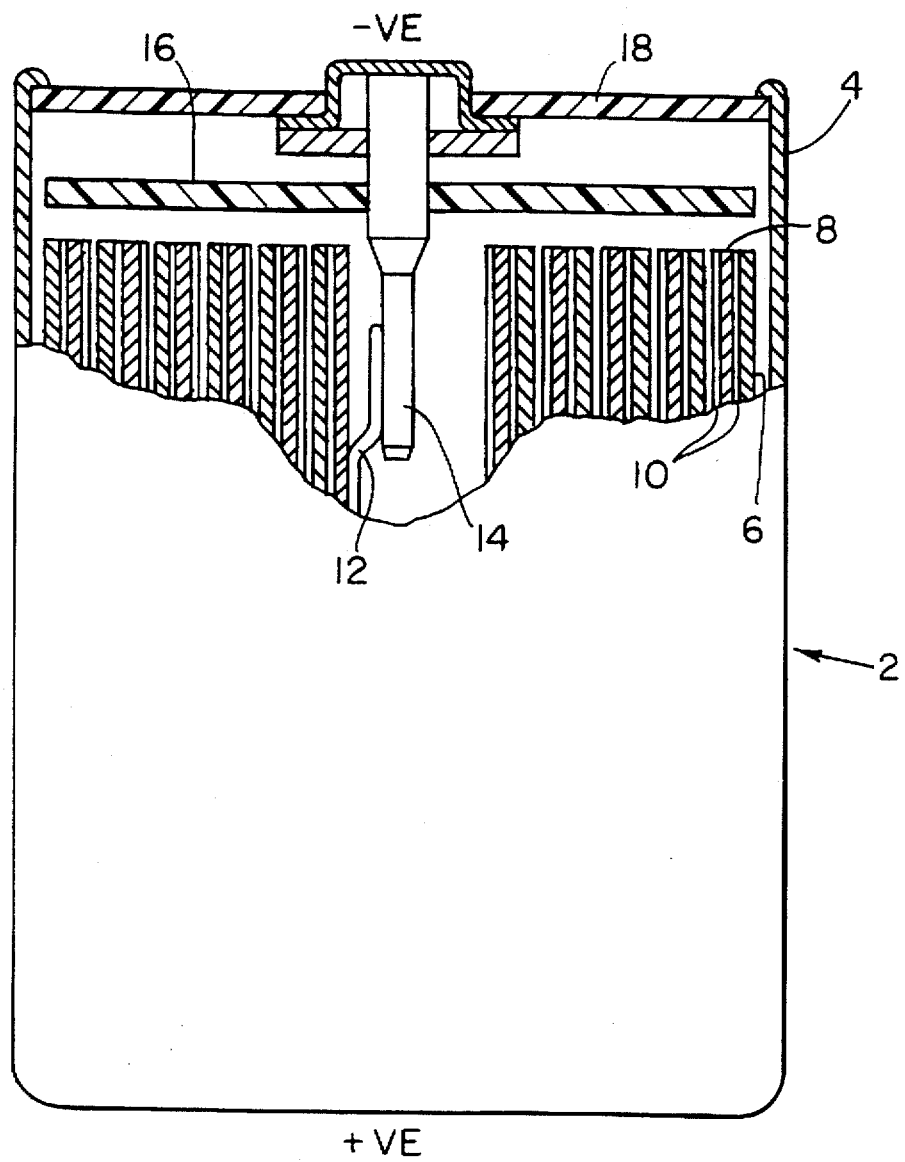
FIG. 1 shows a first rechargeable electrochemical cell, partially in section.

Referring to FIG. 1, there is shown a rechargeable electrochemical cell 2. The cell 2 has a cylindrical outer body 4 which is preferably made of aluminium. The cell 2 has a composite positive electrode 6 formed of lithium sulphite on aluminium foil. The cell 2 further comprises copper foil 8 having a lithium negative electrode. A separator 10 is employed as shown and the composite positive electrode 6, the copper foil 8 and the separator 10 are wound to form a roll as shown. The roll then fits inside the body 4, also as shown.

A copper tab 12 extends from the copper foil 8 to a copper tube 14 which serves as feed through. The body 4 is closed by a polypropylene insulating disc 16 and a polypropylene insulating cap 18.

Preferably, the cell 2 is fabricated in the uncharged state. This is primarily for safety considerations since no lithium metal is then present and should the wound sub-assembly develop a short circuit prior to final assembly with electrolyte. There is no danger of heat generation and fire or explosion. The starting materials in the uncharged state are also much less costly than would be the case for the charged state.

Figure 2:
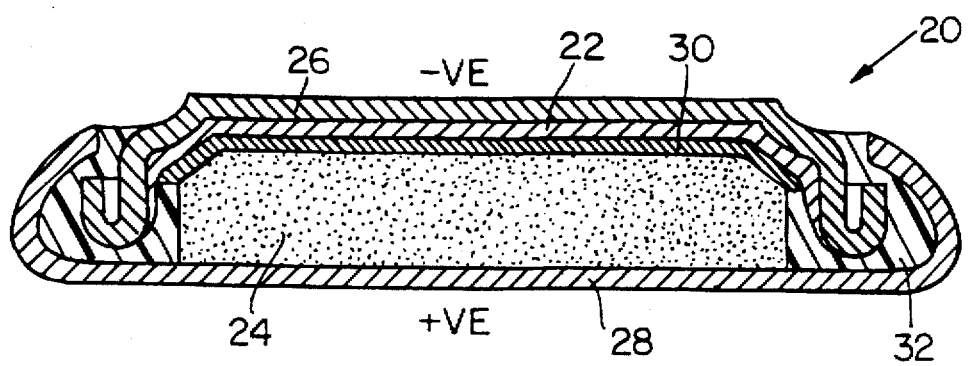
FIG. 2 is a section through a second rechargeable electrochemical cell.

Referring now To FIG. 2, there is shown a rechargeable electrochemical cell 20 which is in the form of a disc. The cell 20 has a lithium negative electrode 22, and a lithium sulphite/transition metal oxide positive electrode 24. An anode current collector 26 forms a negative hole. A positive electrode current collector 28 made of aluminium is provided. The cell 20 also includes a separator 30 and a polypropylene plastics insulator/seal 32.

Figure 3:
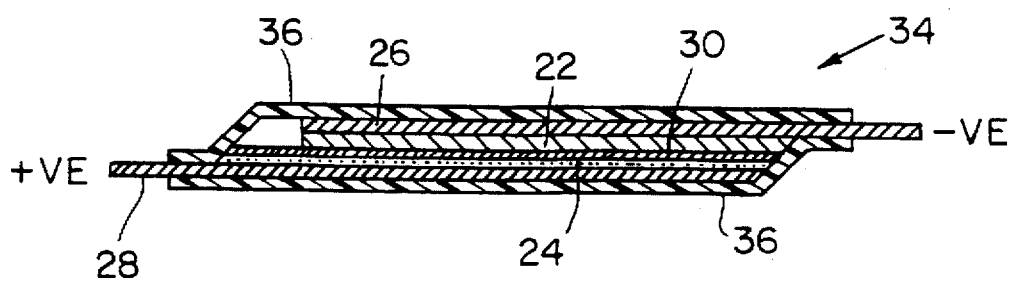
FIG. 3 is a cross section through a third rechargeable electrochemical cell.
Figure 4:
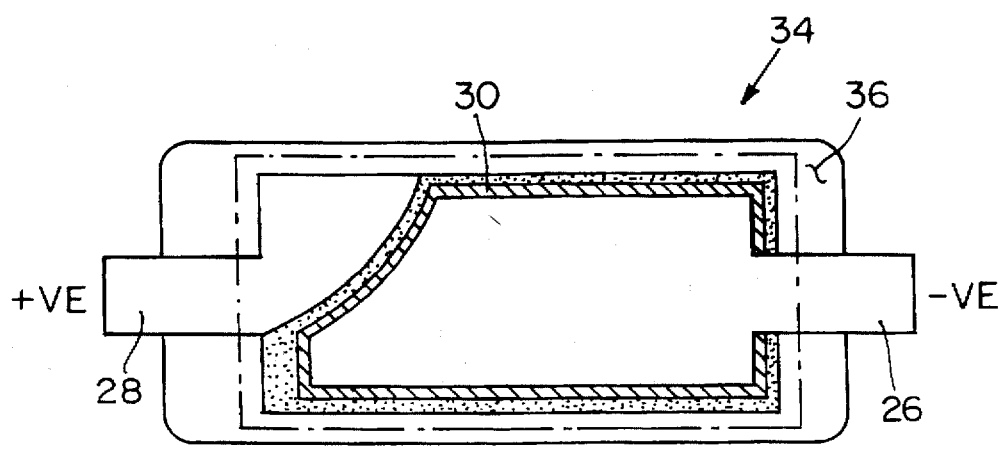
FIG. 4 is a top plan view of the rechargeable electrochemical cell shown in FIG. 3.

Referring now to FIGS. 3 and 4, there is shown a rechargeable electrochemical cell 34 in which similar parts as in FIG. 2 have been given the same reference numerals. In FIGS. 3 and 4, it will be seen that the cell 34 is produced in a flat rectangular shape. The cell 34 includes a plastics sheet 36 which is heat sealed on four sides.

When the rechargeable electrochemical cell of the present invention is in the form of a large rechargeable battery, then one or more such batteries may be used to power electric vehicles. Raw material cost are an important commercial consideration and an iron oxide used as the transition metal is especially appropriate in such applications. The environmental impact will be minimal since the iron and sulphur oxides are in a chemically bound state even when the battery is fully charged.

It is to be appreciated that the embodiments of the invention described above with reference to the accompanying drawings have been given by way of example only and that modifications may be effected.

I claim:

1. A rechargeable electrochemical cell comprising a positive electrode, a negative electrode and an electrolyte, the positive electrode being such that it is a composition of an alkali or alkaline earth salt of a sulphur oxy-acid and a transition metal oxide, and the electrolyte being such that it is a non-aqueous electrolyte containing a soluble salt of the alkali or alkaline earth metal dissolved in the non-aqueous electrolyte.

2. A rechargeable electrochemical cell according to claim 1 in which the salt of a sulphur oxy-acid is a lithium salt.

3. A rechargeable electrochemical cell according to claim 2 in which the lithium salt is a lithium salt selected from the group consisting of lithium sulphite ($Li_2SO_3$), lithium dithionate ($Li_2S_2O_6$), and lithium dithionite ($Li_2S_2O_4$).

4. A rechargeable electrochemical cell according to claim 1 in which the transition metal is at least one of ferrous oxide (FeO), titanium monoxide (TiO), manganous oxide (MnO), manganic oxide ($Mn_2O_3$), vanadium trioxide ($V_2O_3$), vanadium dioxide ($VO_2$), cuprous oxide ($Cu_2O$) and nickelous oxide (NiO).

5. A rechargeable electrochemical cell according to claim 1 in which the alkai or alkaline earth salt in solution is present in approximately one molar concentration.

6. A rechargeable electrochemical cell according to claim 1 in which the alkai or alkaline earth salt in solution in the electrolyte is a lithium salt.

7. A rechargeable electrochemical cell according to claim 6 in which the electrolyte includes a separator which is permeable to lithium ions.

8. A rechargeable electrochemical cell according to claim 7 in which the lithium salt is at least one of lithium fluoroborate ($LiBF_4$), lithium hexafluorophosphate ($LiPF_6$), and lithium trifluoromethane sulphonimide [$LiN(CF_3SO_2)_2$], and in which the lithium salt is in solution in a mixture of a linear carbonate and a cyclic ester as solvent.

9. A rechargeable electrochemical cell according to claim 1 in which the negative electrode is a metal negative electrode.

10. A rechargeable electrochemical cell according to claim 1 in which the negative electrode is coated with a porous substrate into which deposited alkali or alkaline earth metal will intercalate.

11. A rechargeable electrochemical cell according to claim 1 in which the composition of the alkali or alkaline earth salt of a sulphur oxy-acid and the transition metal oxide is provided on a substrate which is wound in the form of a roll.

12. A rechargeable electrochemical cell according to claim 1 and including one or more polymeric tertiary amines.

* * * * *